US007390155B1

United States Patent
Diaz et al.

(10) Patent No.: US 7,390,155 B1
(45) Date of Patent: Jun. 24, 2008

(54) DECK ANCHOR FOR REMOVABLY CONNECTING TO EYELETS

(76) Inventors: Carroll Diaz, 464 W. 47th St., Cut Off, LA (US) 70345; Robbins Marshall Claypool, Jr., 14 Greenbier Ct., New Orleans, LA (US) 70131; Lawrence Crochet, Jr., 209 St. John St., Luling, LA (US) 70070; Mark A. Danos, 3288 Highway 26 West, Poplarville, MS (US) 39470

( * ) Notice: Subject to any disclaimer, the term of this patent is extended or adjusted under 35 U.S.C. 154(b) by 98 days.

(21) Appl. No.: 11/428,989

(22) Filed: Jul. 6, 2006

Related U.S. Application Data

(60) Provisional application No. 60/697,236, filed on Jul. 7, 2005.

(51) Int. Cl.
*B60P 7/08* (2006.01)

(52) U.S. Cl. ............... 410/107; 410/106; 410/109; 410/111; 410/112

(58) Field of Classification Search ............ 410/97, 410/106, 107, 109–112, 116; 24/265 CD, 24/115 K; 248/499
See application file for complete search history.

(56) References Cited

U.S. PATENT DOCUMENTS 6,918,721 B2 * 7/2005 Venton-Walters et al. ... 410/102

* cited by examiner

*Primary Examiner*—Stephen Gordon
(74) *Attorney, Agent, or Firm*—Garvey, Smith, Nehrbass & North, L.L.C.; Charles C. Garvey, Jr.

(57) ABSTRACT

A tie down or strap anchor apparatus is disclosed. The apparatus provides a housing that can be mounted flush with a deck, floor or the like. A connector removably attaches to the housing by depressing a piston downwardly. When not in use, the connector is removed and a spring urges the piston.

15 Claims, 6 Drawing Sheets

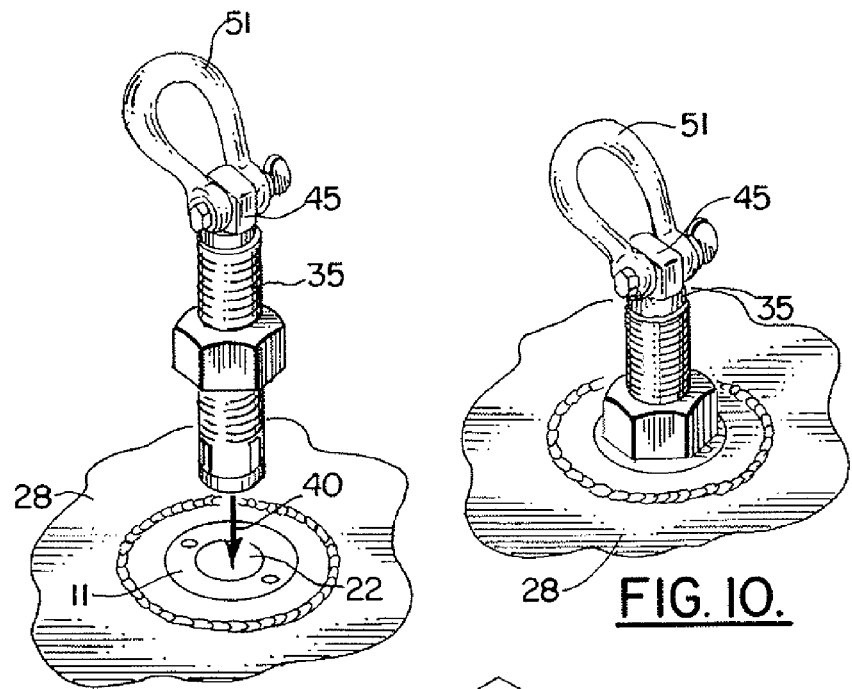
FIG. 9.
FIG. 10.
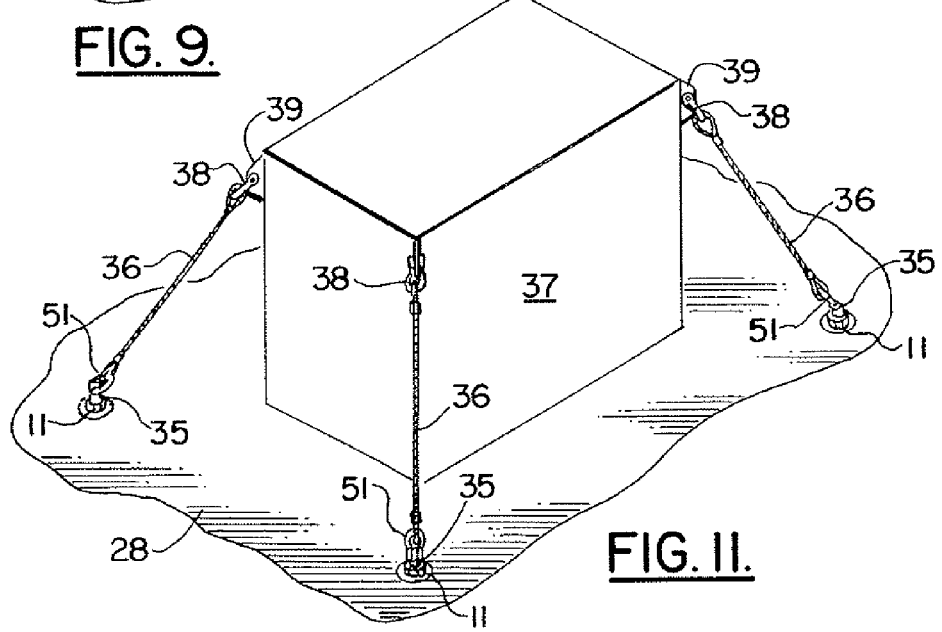
FIG. 11.

US 7,390,155 B1

DECK ANCHOR FOR REMOVABLY CONNECTING TO EYELETS

CROSS-REFERENCE TO RELATED APPLICATIONS

Priority of U.S. Provisional Patent Application Ser. No. 60/697,236, filed Jul. 7, 2005, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to fittings, namely anchors that are used to tie down objects to a supporting deck (for example, a marine vessel, truck, platform or the like) using a plurality of straps or slings.

2. General Background of the Invention

In the marine industry, boats are hampered by the lack of suitable structure for anchoring cargo to the deck of the boat. In rough seas, this cargo tends to shift if not properly restrained. Vessels have used cleats, padeyes, and winches to hold straps, lines or slings that hold the cargo in place.

One of the problems with placing such anchors or fittings on the deck of a boat is that they present a hazard to personnel. Workers can be injured when traversing a deck that has a projecting member such as a cleat.

BRIEF SUMMARY OF THE INVENTION

The present invention solves these prior art problems and short comings by providing a strap anchor apparatus or tie down anchor apparatus of improved configuration and that is recessed, flush with the deck, so that seamen will not trip on them. Such apparatus can be used on trucks or other vehicles as well.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 9-11 are sequential views illustrating connection of the apparatus of the present invention to a package to be secured on a deck.

DETAILED DESCRIPTION OF THE INVENTION

Figure 1:
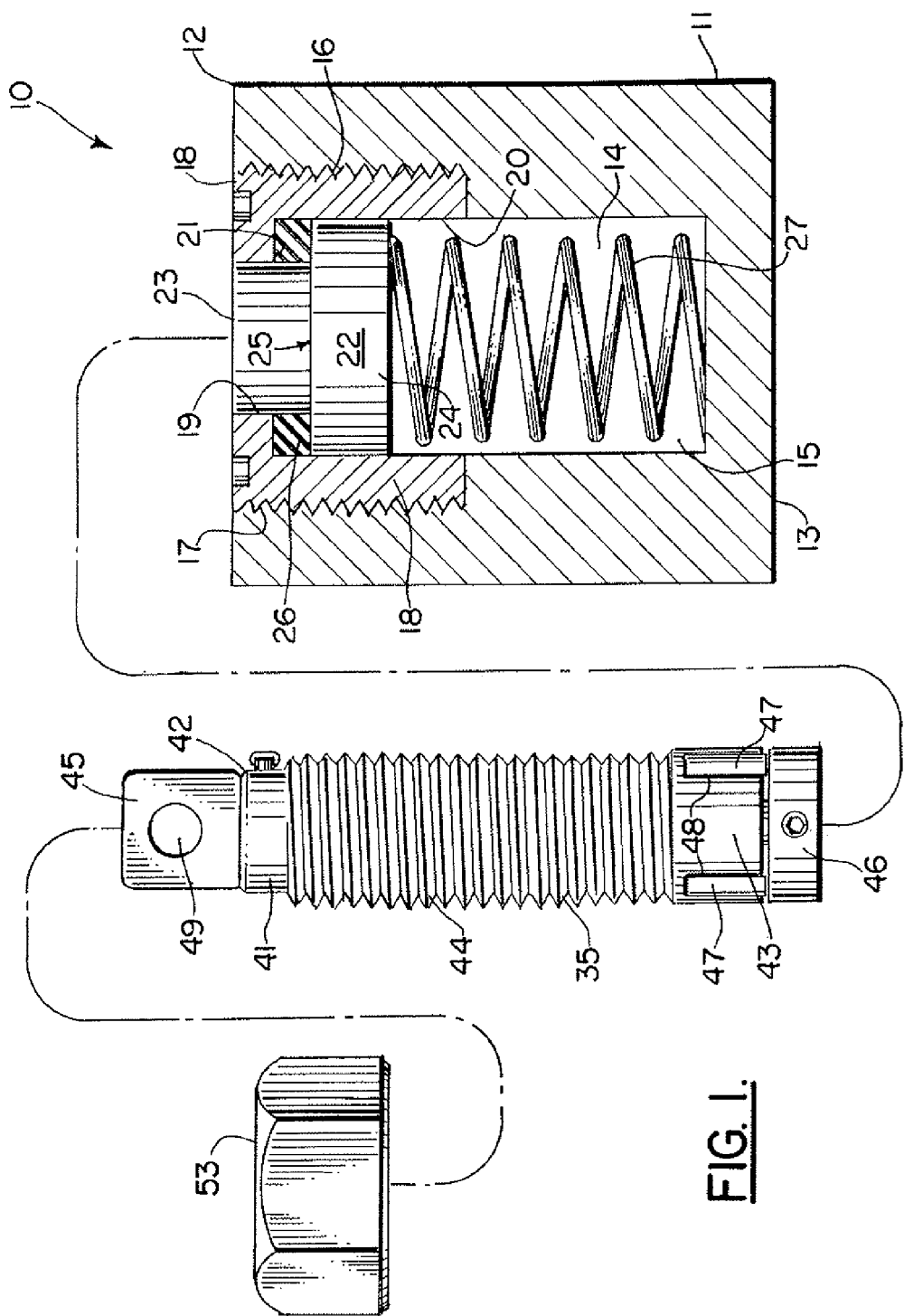
FIG. 1 is a perspective, exploded view of the preferred embodiment of the apparatus of the present invention.

FIGS. 1-4 show generally the preferred embodiment of the apparatus of the present invention designated generally by the numeral 10. Strap anchor apparatus 10 is an apparatus that can be used to secure a package 37 to a deck 28 of a building, vessel or vehicle (e.g. boat, truck, vehicle, platform, building) 28 using a plurality of straps or slings 36. Strap anchor apparatus 10 can be used as a tie down for securing a package wherein a strap 36 spans between the package 37 and an anchor housing 11 to which connectors 35 have been attached. Typically, multiple straps or slings 36 and multiple connectors 35 are required as shown in FIG. 11.

In FIG. 1, anchor housing 11 has an upper end portion 12 and a lower end portion 13. The anchor housing 11 provides an upwardly extending socket 14. Housing 11 can be closed at the bottom, and provides a smaller diameter section 15 and a larger diameter section 16. The larger diameter section 16 provides internal threads 17 that are receptive of a threaded sleeve 18. The threaded sleeve 18 has an internal bore that includes smaller diameter bore section 19 and larger diameter bore section 20. Annular shoulder 21 extends generally horizontally in between the bore sections 19, 20 of sleeve 18.

Figure 2:
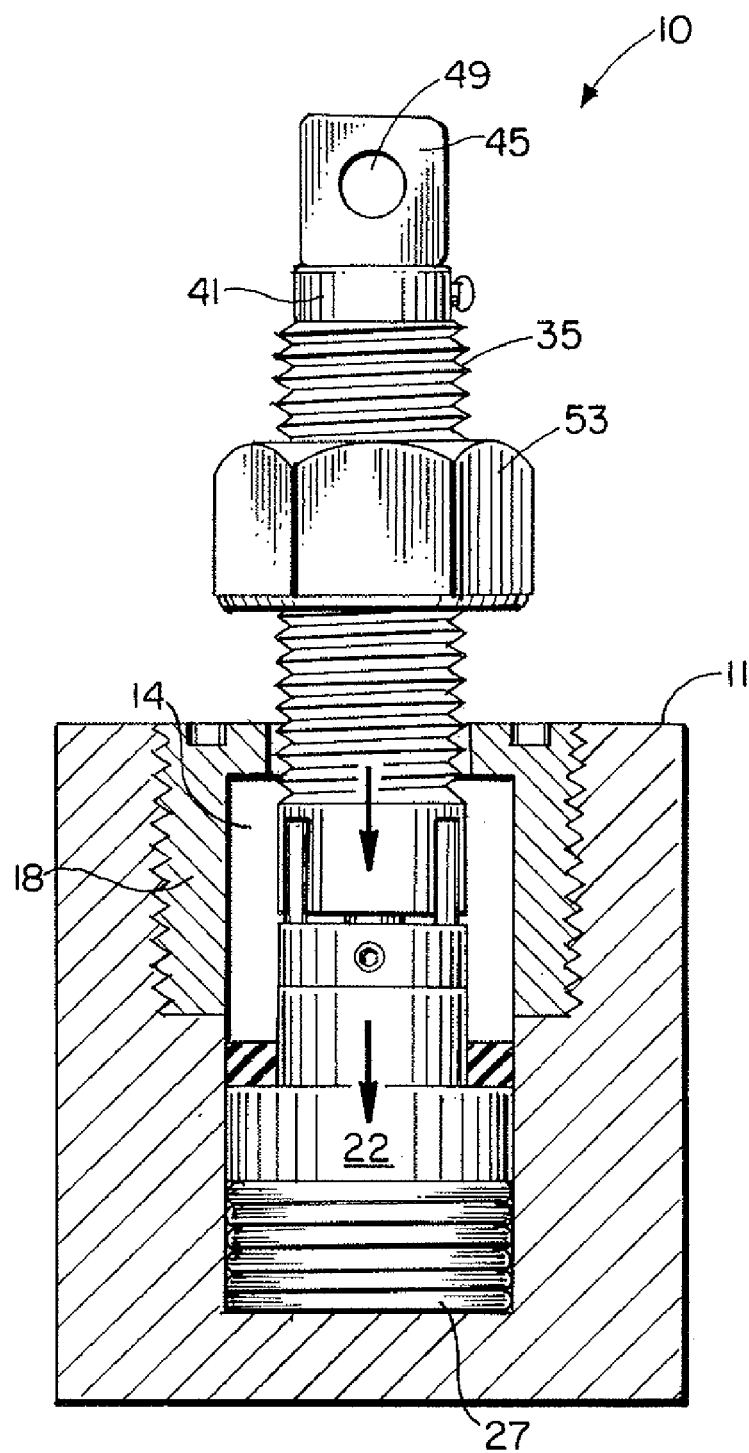
FIG. 2 is a sectional, elevation view of the preferred embodiment of the apparatus of the present invention.
Figure 3:
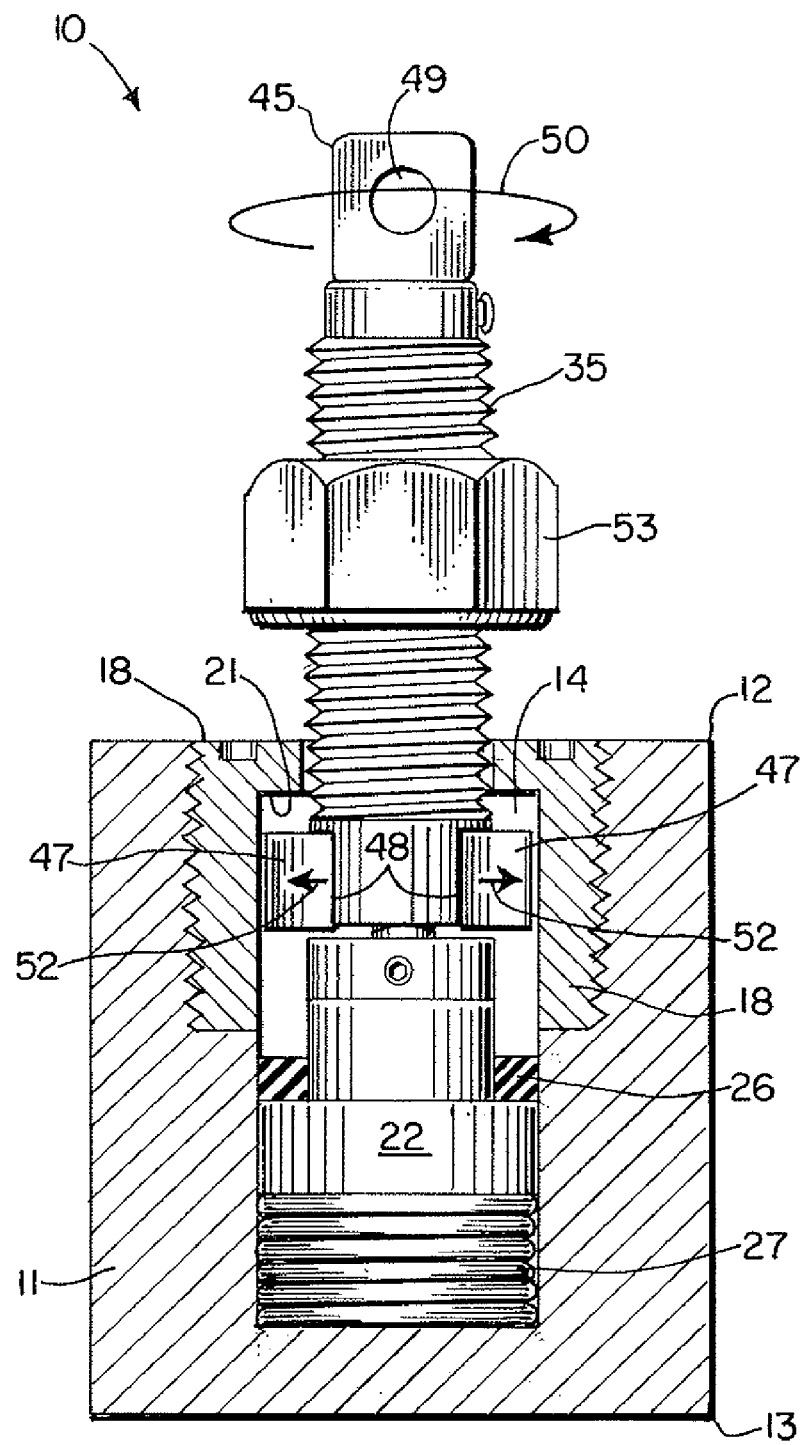
FIG. 3 is a sectional, elevation view of the preferred embodiment of the apparatus of the present invention illustrating expansion of the locking fingers.
Figure 4:
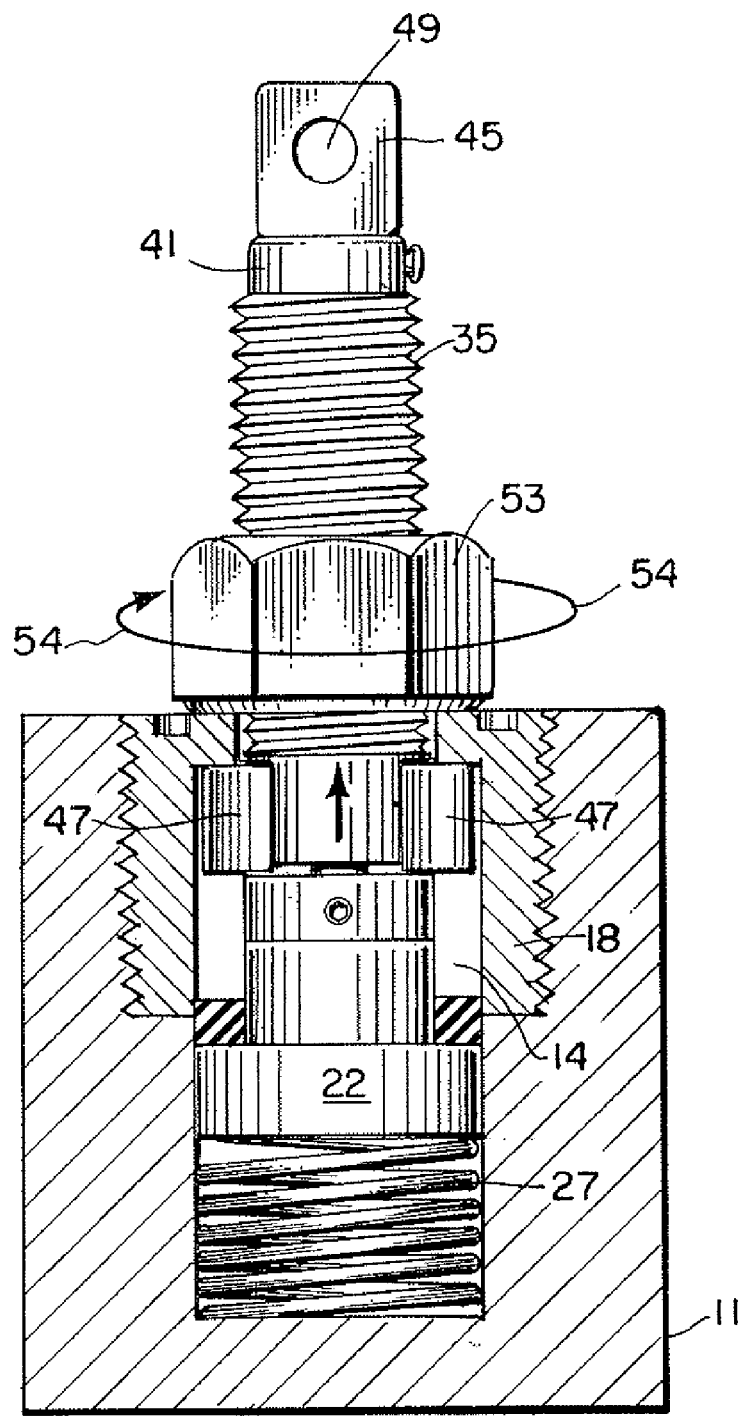
FIG. 4 is a sectional, elevation view of the preferred embodiment of the apparatus of the present invention, illustrating the final attachment of the connector to the anchor housing a threaded nut.

A piston 22 is mounted in socket 14 to move between an upper position shown in FIG. 1 and a lower position shown in FIGS. 2-4. Piston 22 has a smaller diameter section 23 and a larger diameter section 24. Annular shoulder 25 is placed at the intersection of smaller diameter section 23 and larger diameter section 24.

A washer 26 (such as a rubber washer or polymeric washer) can be placed on annular shoulder 25. During use, the washer 26 bares against annular shoulder 25 of piston 22 and annular shoulder 21 of sleeve 18 when the piston 22 is in the upper position of FIG. 1.

Spring 27 urges piston 22 to the upper position of FIG. 1. FIG. 1 shows the piston 22 in its upper position with spring 27 in its expanded position. FIGS. 2-4 show piston 22 in lower positions wherein spring 27 is compressed.

Figure 5:
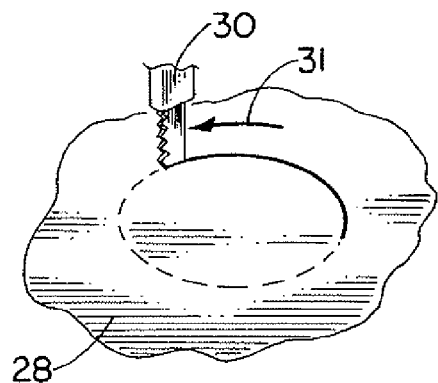
FIGS. 5-8 are sequential views illustrating installation of the apparatus of the present invention to a section of deck plate.
Figure 6:
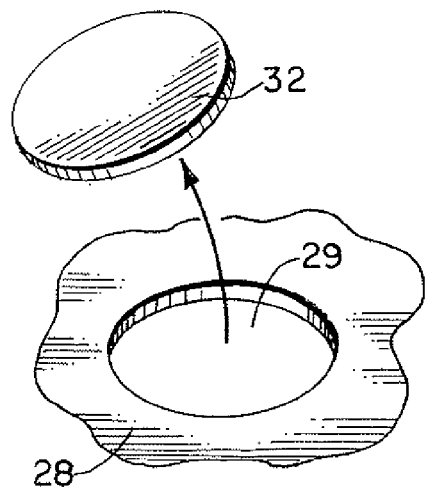
Figure 7:
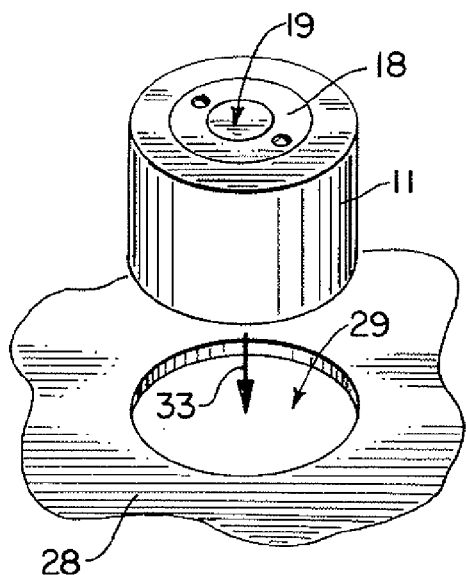
Figure 8:
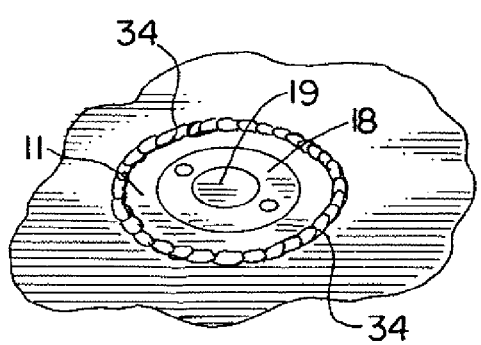

FIGS. 5-8 illustrate an installation of the apparatus 10 of the present invention to a section of deck plate 28 or the like. In FIG. 5, deck plate 28 is cut using cutter 30 that moves in a circular path as shown by arrow 31. In FIG. 6, a section 32 is removed by the cut of FIG. 5 to provide an opening 29 that is receptive of housing 11. In FIG. 7, arrow 33 indicates that housing 11 is lowered into opening 29. In FIG. 8 housing 11 is welded at weld 34. In this position, the upper surface of housing 11 is flush with deck plate 28 as shown.

In FIGS. 2-4 and 9-10 a connector 35 is shown that can attach to housing 11. Connector 35 has an eyelet 49 that enables a strap 36 to be connected to the connector 35 and also to the anchor housing 11. In FIG. 11, a plurality of straps 36 are seen spanning between package 37 and the connectors 35 that are each attached to a strap anchor apparatus 10. Shackles 38 can be used to form an attachment between each strap 36 and padeye 39 of package 37. Similarly, shackles 51 can be used to form part of the rigging between package 37 and connector 35, being attached to the upper end portion of connector 35 at eyelet 49 as shown in FIGS. 9-11.

In FIGS. 2-4 and 9, attachment of connector 35 to strap anchor apparatus 10 is shown and illustrated by the arrow 40 in FIG. 9. To perfect the connection between strap anchor apparatus 10 and connector 35, the connector 35 is lowered into smaller diameter bore section 18 of threaded sleeve 18 as shown in FIGS. 2 and 9. Connector 35 includes a tool body 41 having an upper end portion 42 and a lower end portion 43. The tool body 41 is externally threaded, providing external threads 44. A central shaft 45 extends vertically through the tool body 41, occupying a provided open-ended bore. At the lower end portion 43 of tool body 41, plate 46 is connected to central shaft 45 and rotates therewith. A plurality of two or more extendable fingers 47 are pivotally mounted upon pegs that are attached on plate 46 that extend from the upper surface of plate 46. Each peg is generally parallel to central shaft 45. Slots 48 are radially extending slots that extend from the bore occupied by central shaft 45 to the outer surface of tool body 41 at its lower end portion 43 as shown in FIG. 1.

In order to form a connection between connector 35 and housing 11, the extendable fingers 47 are inserted into socket 14 a sufficient distance so that they are positioned below annular shoulder 21 as shown in FIG. 3. Shaft 45 is then rotated as indicated by arrow 50 in FIG. 3. This rotation of the shaft 45 rotates plate 46 and its pegs, causing the extendable fingers 47 to move to the extended position of FIGS. 3 and 4. Nut 53 is then rotated in the direction of arrow 54, which elevates the extended fingers 47 in the direction of arrow 52. Nut 53 is then tightened by rotating it in the direction of arrow 54 in FIG. 4 pulling the fingers 47 upwardly until they engage the shoulder 21.

The following is a list of parts and materials suitable for use in the present invention.

PARTS LIST

| Part Number | Description |
|---|---|
| 10 | strap anchor apparatus |
| 11 | anchor housing |
| 12 | upper end portion |
| 13 | lower end portion |
| 14 | socket |
| 15 | smaller diameter section |
| 16 | larger diameter section |
| 17 | internal threads |
| 18 | threaded sleeve |
| 19 | smaller diameter bore section |
| 20 | larger diameter bore section |
| 21 | annular shoulder |
| 22 | piston |
| 23 | smaller diameter section |
| 24 | larger diameter section |
| 25 | annular shoulder |
| 26 | washer |
| 27 | spring |
| 28 | deck plate |
| 29 | opening |
| 30 | cutter |
| 31 | arrow |
| 32 | removed section |
| 33 | arrow |
| 34 | weld |
| 35 | connector |
| 36 | strap |
| 37 | package |
| 38 | shackle |
| 39 | padeye |
| 40 | arrow |
| 41 | tool body |
| 42 | upper end |
| 43 | lower end |
| 44 | external thread |
| 45 | central shaft |
| 46 | plate |
| 47 | extendable fingers |
| 48 | slot |
| 49 | eyelet |
| 50 | arrow |
| 51 | shackle |
| 52 | arrow |
| 53 | nut |
| 54 | arrow |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A strap anchor apparatus, comprising;
   a) a section of decking having a decking surface and an underside;
   b) a housing mounted to the decking at a decking opening, the housing having an upper surface with an opening, the opening communicating with an upwardly facing socket;
   c) a piston mounted in the socket to move between upper and lower positions, the piston having an upper surface;
   d) an energized device for urging the piston upwardly toward the upper position;
   e) a stop that halts upward movement of the piston when the upper surface of the piston reaches a position next to the upper surface of the housing; and
   f) an anchor bolt that has a lower end portion that fits the socket, the anchor bolt being insertable into the socket by depressing the piston and energized device so the piston assumes the lower position, the anchor bolt having extendable locking portion or portions that enable anchoring of the anchor bolt to the housing below the housing opening.

2. The strap anchor of claim 1 wherein the device is spring loaded.

3. The strap anchor of claim 1 wherein the energized device is a spring.

4. The strap anchor of claim 1 wherein the piston upper surface is substantially flush with the decking surface.

5. The strap anchor of claim 1 further comprising external threads on the bolt.

6. The strap anchor of claim 5 further comprising a nut that threadably engages the external threads of the bolt.

7. The strap anchor of claim 1 wherein the locking portions are movable between retracted and extended positions along radial paths.

8. The strap anchor of claim 1 wherein the housing is comprised of a housing body having an interior and a sleeve that fits the interior.

9. The strap anchor of claim 8 further comprising a threaded connection that joins the sleeve to the body.

10. The strap anchor of claim 8 wherein the housing interior is generally cylindrically shaped and the sleeve is generally cylindrically shaped to fit the housing interior, the housing providing a closed end portion below the interior.

11. The strap anchor of claim 8 wherein the sleeve has a sleeve bore that is receptive of the bolt.

12. The strap anchor of claim 11 wherein the sleeve has an annular shoulder surrounding an opening that provides the housing opening.

13. The strap anchor of claim 1 wherein an upper end portion of the housing is welded to the decking.

14. The strap anchor of claim 12 wherein the annular shoulder provides said stop.

15. The strap anchor of claim 14 further comprising a washer that is positioned around the piston and below the annular shoulder.

* * * * *